UNITED STATES PATENT OFFICE.

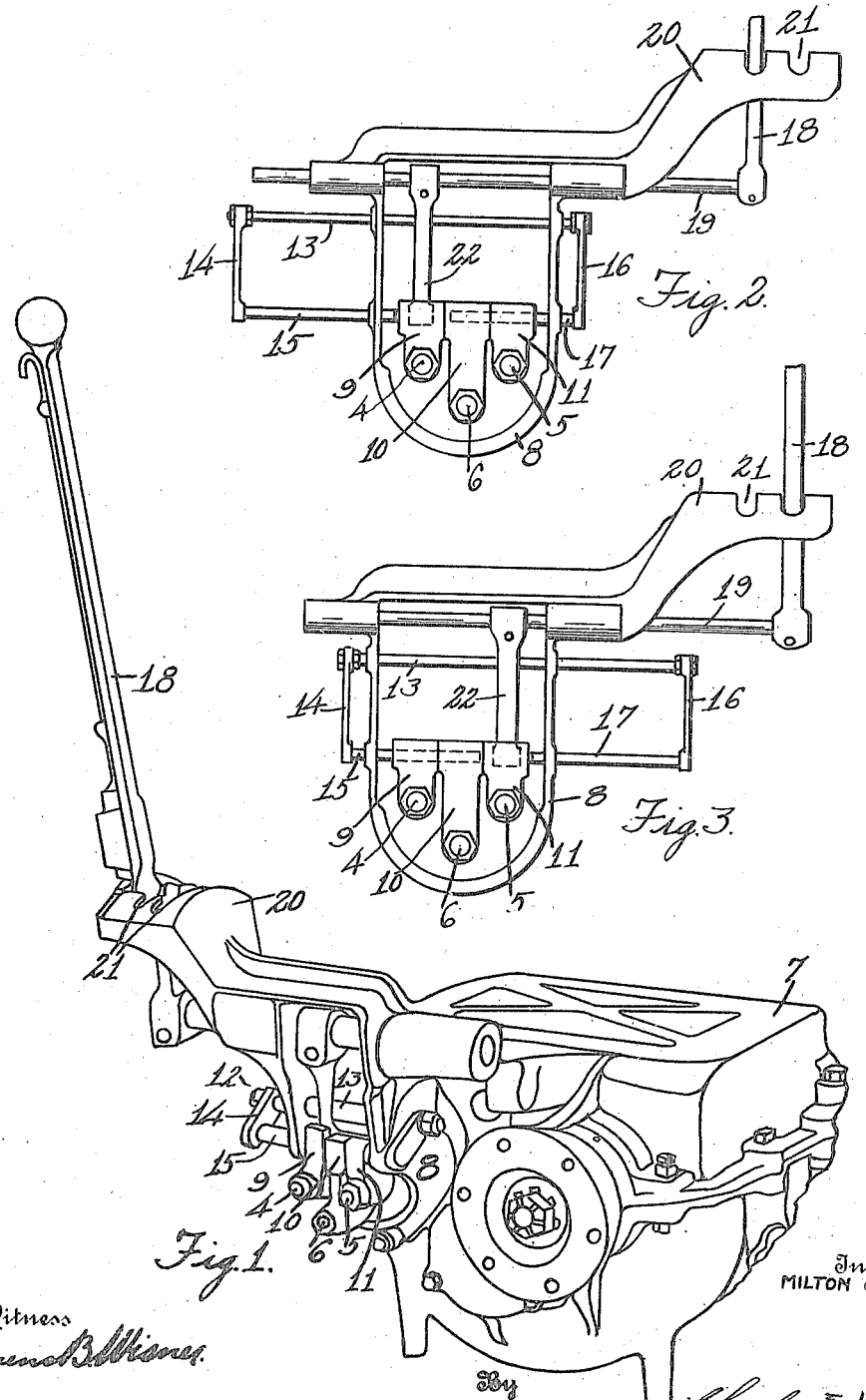

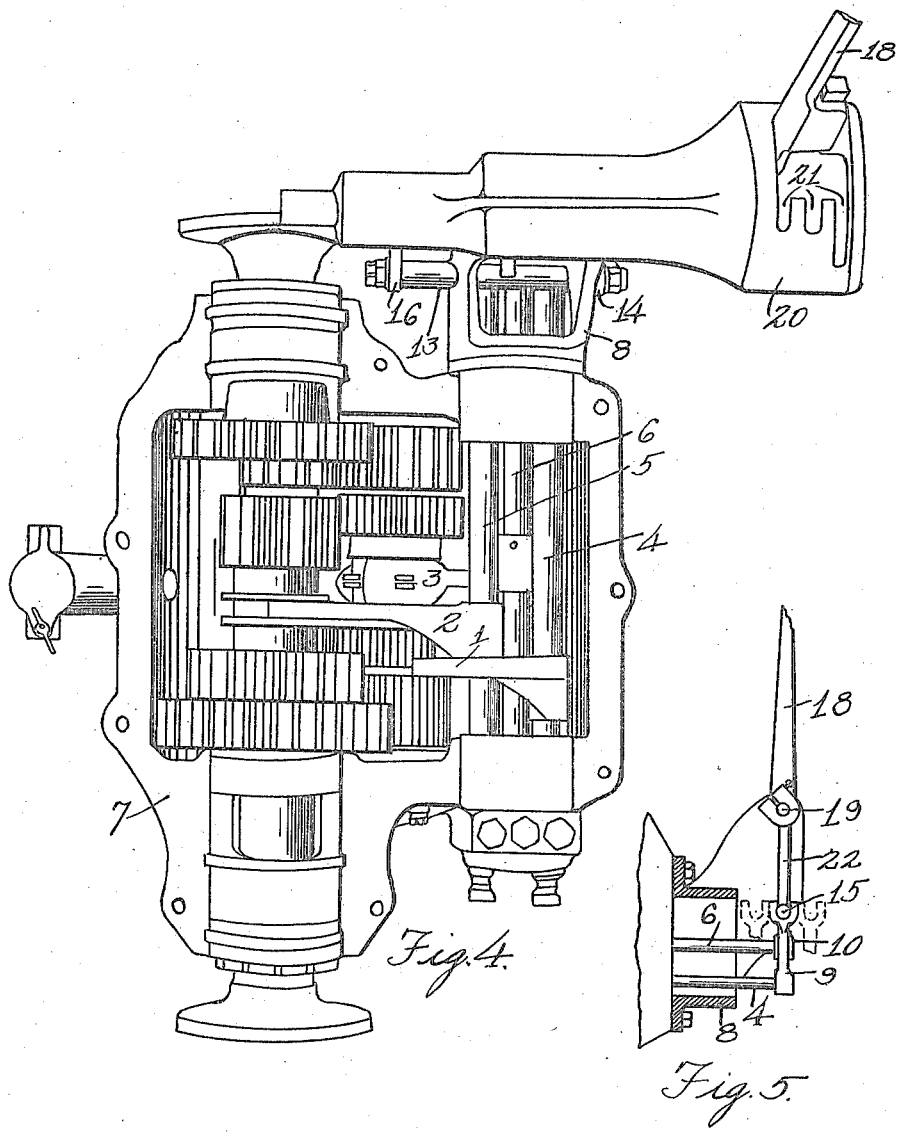

MILTON O. CROSS, OF DETROIT, MICHIGAN.

GEAR-SHIFTING DEVICE.

1,248,817.  Specification of Letters Patent.  Patented Dec. 4, 1917.

Application filed March 3, 1917. Serial No. 152,273.

*To all whom it may concern:*

Be it known that I, MILTON O. CROSS, a citizen of the United States, residing at Detroit, county of Wayne, State of Michigan, have invented a certain new and useful Improvement in Gear - Shifting Devices, and declare the following to be a full, clear, and exact description of the same, such as will enable others skilled in the art to which it pertains to make and use the same, reference being had to the accompanying drawings, which form a part of this specification.

This invention relates to gear shifting devices and its object is a device for shifting the gears in transmission sets that is simple and inexpensive in construction and in which all the shifting devices except the one in use are automatically locked in neutral position. A further object is a locking device in combination with a transmission set having plurality of gear shifting devices that, upon movement of the operating arm to engage any one of the shifting devices, is moved to engage the other shifting devices to hold the same in neutral position.

Heretofore it has been the practice to rely upon a spring to hold the gear shifter in neutral position during the time the shifting arm is out of engagement therewith and as the spring may weaken or break and allow the gear to shift, by reason of the vibration of the parts or other cause, and engage its companion gear, such devices have been found unsatisfactory. In the invention herein disclosed, as the shifting lever is withdrawn from engagement with one of the shifting devices to engage another similar device of the set, a locking bar or rod engages the idle devices and positively holds the same from operation until the locking bar is again reset by movement of the shifting arm.

These and other objects and the several novel features of the invention are hereinafter more fully described and claimed and shown in the accompanying drawings in which—

Figure 1 is a perspective view of a transmission set showing my improved shifting device.

Fig. 2 is an end view of the shifting device set to operate one of the arms.

Fig. 3 is a similar view showing the device set to operate another of the arms.

Fig. 4 is a plan view of a transmission set showing the relation of the shifting arms and gears.

Fig. 5 is a detail in section showing the shifting lever in engagement with one of the arms.

Similar characters refer to similar parts throughout the drawing and specification.

The transmission set may be of any approved type in which the gears are moved longitudinally on the supporting shafts to engage the companion gears. In the example shown in the drawings there are three shifting devices 1, 2 and 3 on the rods 4, 5 and 6 respectively. The gears are mounted in a case 7 and the movement of the gears is similar to that of the usual well known devices of this nature and the operation thereof being well known, no further description is considered necessary. These rods 4, 5 and 6 extend outwardly through one end of the case through a housing 8 mounted on the end of the transmission case and are movable longitudinally in the casing to shift the gears. Secured to the ends of the rods are the operating arms 9, 10 and 11 respectively bifurcated at the upper end as indicated in Fig. 4. Mounted in the upper part of the housing 8 is a locking device 12 consisting of a rod 13 mounted in apertures at each side of the upper part of the housing and movable transversely of the rods 4, 5 and 6. Connected to the rod 13 by means of a bar 14 is a stub shaft 15 on one side of the housing and on the other side of the housing is a similar bar 16 supporting a stub shaft 17. The stub shafts 15 and 17 each ride in bearings in the housing 8 and engage in the bifurcations of the arms 9, 10 and 11, as will be understood clearly from Figs. 2 and 3. The ends of the shafts 15 and 17 are spaced apart as shown, and are of such length that only two of the arms may be engaged by either rod on the movement thereof to the right or left. When in neutral position the bifurcations of the arms 9, 10 and 11 are in alinement so that the rods 15 and 17 may be moved into engagement therewith.

To move the locking device and shifting arms and attached rods, a shifting lever 18 is provided attached to a rod 19 movable transversely of the rods 4, 5 and 6 and carried in bearings in the upper part of the housing 8. The housing is formed with an extension 20 having several slots 21 in which the shifting arm may be positioned.

Within the housing and secured to the rod 19 is an arm 22 having an end adapted to engage the bifurcations of either of the shaft arms 9, 10 and 11 being shaft like in form and extending between the spaced ends of the stub shafts 15 and 17 and in alinement and practically in engagement with the ends of the arms respectively, as will be understood from the drawing. On movement of the rod 19 transversely by means of the shifting lever 18, the arm 22 is made to move transversely from one arm 9, 10 or 11 to the other in either direction.

As will be understood from Figs. 2 and 3, on movement of the arm from the position shown in Fig. 2, the stub shaft 17 is engaged by the end of the arm 22 and moved by movement of the arm 22. Thus as is shown in Fig. 2 the arm 22 is engaging the shifting arm 9, if it be desired to move this arm 22 to engage the shifting arm 10, the shifting lever is moved to the right into engagement with a succeeding slot in the bracket 20 and these slots are so positioned that on such movement of the lever the end of the arm 22 engages the bifurcation of the arm 10 and this movement has forced the stub shaft 17 out of engagement with the arm 10 leaving it in engagement only with the arm 11, which holds the said arm and connected shaft and shifting device in neutral position. This movement also forces the stub shaft 15 into engagement with the bifurcation in the shifting arm 9 also holding it fixedly in neutral position. The arm 22 may now be actuated by the shaft 17 by the shifting lever 18 which moves the rod 6 longitudinally and shifts the corresponding gear. In the same manner the arm 11 may be engaged by the shifting arm 22 in which case the stub shaft 17 is entirely out of engagement with any of the shifting arms while the stub shaft 15 is brought into engagement with the arms 9 and 10.

By this arrangement it is readily seen that the shifting levers are positively held in neutral position during the shifting of any one of the set and that the device is very simple and positive in operation and is inexpensive in construction.

In the embodiment of the invention here shown, what I have termed the locking device, comprising the rods 13, 15 and 17, is movable solely by reason of contact of the end of the arm 22 with the end of the arm of the stub shaft 15 or 17 as the case may be, the said shafts or rods being freely movable in the apertures therefor in the housing. By thus utilizing the shifting arm to move the locking bars or rods, the said shifting arm cannot be moved to position to engage any of the arms on the rods 4, 5 and 6 without first displacing the locking rod or shaft. Such arrangement results in a very simple and inexpensive device and one that is positive in action, and no shifting arm and attached rod may be moved by the shifting lever until the lever is fully engaged in the bifurcation of the arm and the locking bar completely displaced therefrom.

Having thus briefly described my invention, its utility, and mode of operation, what I claim and desire to secure by Letters Patent of the United States is—

1. In a gear shifting device, the combination with the gears the casing, and shifters therefor of a rod for each of the shifters movable longitudinally in supports in the casing, a bifurcated arm on each of the said rods positioned to be in alinement transversely of the rods when in neutral position, a shifting lever having an end adapted to engage in the bifurcation of any one of the arms, means for moving the lever to actuate the engaged arm and attached shifting rod, and a locking device involving a bar or rod on opposite sides of the end of the shifting arm and movable in the bifurcations of the rod arms by movement of the shifting lever.

2. In a locking device for the gear shifting rods of a transmission set, a bifurcated arm attached to each of the rods, the arms being in alinement transversely of the rods when the rods are in neutral position, a shifting lever having an end adapted to engage in the bifurcation of any one of the arms and to actuate the same, a bar or rod on opposite sides of the end of the shifting arm adapted to engage in the bifurcations of the rod arms when in neutral position, the two said bars or rods being adapted to be moved in unison by movement of the shifting lever.

3. In a locking device for the gear shifting rods of a transmission set the combination with the gears and shifters therefor of a bifurcated arm attached to each of the shifting rods positioned in alinement transversely of the rods when in neutral position, the said bifurcated arms being practically equal in width, a shifting arm, a lever for actuating said shifting arms to engage any one of the bifurcated rod arms and to move the rod arm to shift the corresponding gear, a rod or bar on opposite sides of the end of the shifting arm movable in the bifurcations of the rod arms by movement of the shifting arm, the end of the shifting arm being of a length practically equal to the width of the bifurcated end of a rod arm and adapted to move the rods lying in the bifurcations of the arms by direct contact therewith.

4. In combination, a plurality of gear shifting rods, an arm having a bifurcated end attached to each of the rods, said ends being of substantially equal width and in alinement transversely of the rods when in neutral position, a shifting arm having an end of a length substantially equal to the width of any one of the arms and movable to engage any one of the arms and to shift the attached shifting rod longitudinally, and a locking device comprising a pair of rods supported in alinement, the adjacent ends thereof being a distance to allow movement of the end of the shifting arm therebetween, the rods being oppositely positioned and adapted to be moved longitudinally in the bifurcations of the rod arms upon movement of the shifting arm into engagement with a bifurcated arm.

5. In a gear shifting device, the combination with the gears of a transmission set, a casing and shifting devices therefor, of a rod for each of the shifters movable longitudinally in the case each extending outwardly from the casing, a housing for said ends, a bifurcated arm on each of the said rod ends being of substantially equal width and in alinement transversely of the rods when in neutral position, a shifting arm having an end adapted to engage and of the width substantially equal to the bifurcated end of any one of the arms, a shifting lever adapted to move the shifting arm to engage any one of the rod arms and to shift the attached rod longitudinally, a slotted bracket by means of which the shifting lever may be positioned, there being a slot for each of the rod arms spaced to properly position the shifting arm, and a locking device comprising a pair of similar rods oppositely positioned and spaced centrally to allow movement of the end of the shifting arm therebetween, the rods being supported in the housing and adapted to be moved longitudinally in unison in the bifurcations of the rod arms by contact of the end of the shifting arm therewith on movement in either direction to engagement with a bifurcated arm.

6. In a gear shifting device a plurality of shifting rods, an arm having a bifurcated end attached to each of the rods by means of which the companion rod may be moved to shift the corresponding gear, the bifurcated ends being in alinement when the rods are in neutral position, a pair of locking bars adapted to be moved longitudinally only transversely of the shifting rods in the said bifurcated ends and spaced to admit of movement of a bifurcated arm therebetween, a shifting lever adapted to be set to engage any one of the bifurcated arms between the locking bars, the locking bars being adapted to be displaced, on movement of the shifting lever, to free the arm about to be engaged.

In testimony whereof, I sign this specification.

MILTON O. CROSS.

Copies of this patent may be obtained for five cents each, by addressing the "Commissioner of Patents, Washington, D. C."